3,365,496
2-CYCLOBUTYLAMINO-1-(3,4-DIHYDROXYPHEN-YL)-ETHANOL AND THE SALTS THEREOF
Douglas Archibald Peak, Kenneth John Nichol, and Grace Lilian Mary Harmer, Nottingham, England, assignors to Boots Pure Drug Company Limited, Nottingham, England, a company of Great Britain
No Drawing. Filed June 29, 1965, Ser. No. 468,103
Claims priority, application Great Britain, July 2, 1964, 27,417/64
3 Claims. (Cl. 260—570.6)

This invention relates to novel derivatives of ethanolamine. In particular, it relates to N-cyclobutylnoradrenaline and N-cyclopropylnoradrenaline and to processes for their preparation. It also relates to pharmaceutical compositions which are valuable in human and veterinary medicine.

The naturally occurring hormone adrenaline and its analogues are powerful sympathomimetic agents and also possess to a greater or lesser degree the property of bronchodilatation. These compounds are valuable agents for the relief of bronchospasm in bronchial asthma.

We have now discovered that certain novel cycloalkyl analogues of adrenaline have bronchodilator activity superior to that of adrenaline and are well tolerated by men and animals.

According to the present invention there are provided 2-cyclobutylamino-1-(3,4-dihydroxyphenyl)-ethanol, 2-cyclopropylamino-1-(3,4-dihydroxyphenyl)-ethanol and acid addition salts thereof. There are also provided therapeutic compositions comprising at least one of the above compounds or salts thereof as active component optionally in association with other pharmacologically active ingredients.

The novel compounds of the present invention may be prepared by methods well known in the art for the preparation of analogues of adrenaline. One method of preparation is by reacting a 4-haloacetylcatechol with the cycloalkylamine and reducing the intermediate ketone to a secondary alcohol in known manner, for example by chemical reduction or by catalytic hydrogenation. Another method of preparation is by reductive alkylation whereby a solution of noradrenaline or noradrenalone and the cycloalkanone is reduced catalytically. Similarly, the compounds of the present invention may be prepared by catalytically hydrogenating a solution of 3,4-dihydroxyphenyl-glyoxal and the cycloalkylamine.

Another method of preparation of the compounds of the present invention is by reacting 3,4-dihydroxystyrene oxide with the cycloalkylamine.

It is well known that compounds containing the 3,4-dihydroxyphenyl group are very susceptible to oxidation and it is convenient to carry out the above reactions and the preparation of the intermediates after the introduction of a protecting group on each of the two phenol radicals. The benzyl group is particularly valuable as a protecting group because it is readily removed during the step of catalytic hydrogenation, usually the final step of the processes described above. In the case of a process wherein the reduction of a keto group is not involved, for example in the condensation of a styrene oxide with a cycloalkylamine or where a keto group has been reduced chemically, a final catalytic hydrogenation may be introduced to remove the protecting benzyl group.

The racemic mixture of optically active isomers prepared by the processes herein described may be resolved by known methods into the individual stereo isomers if so desired.

The bronchodilator activity of the compounds according to the present invention has been tested by a modification of the guinea pig bronchiole preparation described by Konzett and Rossler, Arch. Exp. Path. Pharmak., 1940, 195, 71. When tested against histamine- and acetylcholine-induced bronchospasm the compounds and their salts were found to be powerful bronchodilators.

A preferred compound, 2-cyclobutylamino-1-(3,4-dihydroxyphenyl)-ethanol hydrochloride, has an acute oral $LD_{50}$ of 1200 mg./kg. in mice and of 4000 mg./kg. in rats. The intravenous $LD_{50}$ in mice is 120 mg./kg.

This compound has been tested in man and it has been confirmed that it is a powerful, well-tolerated bronchodilator. It has been administered by inhalation of 1% w./w. and 2% w./w. aqueous solutions using a Wright nebuliser and the effect on the forced expiratory volume and forced vital capacity were measured. Similar measurements have been made after administration of the compound as sublingual tablets containing 10 mg. of the active compound.

The active compounds of the invention may be administered orally, sublingually, by inhalation or by subcutaneous, intramuscular or intravenous injection.

The compositions according to the present invention comprise the active compound, preferably in the form of one of its nontoxic salts, in association with a diluent or carrier. The solid compositions of the invention adapted for oral administration may comprise the active compound in the form of tablets, lozenges, capsules and the like in association with conventional bases for such composition. The amount of the active compound contained in a single dosage unit may vary but the preferred dose is 5–20 mg. of a non-toxic salt of the amine. The preferred salts are the hydrochloride and the sulphate although organic acid salts such as the tartrate may be employed.

The liquid compositions of the invention may be adapted for administration by injection or by inhalation. Injectable compositions may comprise the active compound in the form of a water soluble salt such as the sulphate or hydrochloride in sterile aqueous solution. There may be added to the solution conventional agents for the adjustment of the tonicity such as sodium chloride. The stability of the solutions for injection may be improved by addition of buffering agents to maintain a given degree of acidity. The active compounds of the invention are particularly susceptible to oxidation and it may be desirable to incorporate a suitable antioxidant in solutions of the active compound. Suitable antioxidants are those compounds which are non-toxic and which do not oxidise with the formation of coloured products, such as sodium metabisulphite, acetone-bisulphite, sodium formaldehyde sulphoxylate, thioglycerol or cystein. To maintain the sterility of injectable solutions in multidose containers a bacteriostat compatible with the active compound may be included.

Compositions adapted for inhalation therapy may be in form of liquid solutions or dispersions. A solution adapted for inhalation may comprise an aqueous solution of a non-toxic salt of the active compound to which may be added an antioxidant of the type hereinbefore described if so desired. The solution may be administered by mechanical dispersion using a conventional atomiser or in the form of self propelled aerosol preparation using conventional gaseous or volatile liquid propellants.

The dispersions adapted for inhalation comprises the active compound or a non-toxic salt thereof suspended in an inert medium which may be an inert propellant such as Freon, a proprietary mixture of chlorofluoroalkanes, or proprietary mixtures of butanes. For convenience the chlorofluoroalkane propellants are referred to under the trade name Freon throughout the specification.

The preferred compositions are dispersions of the active ingredient adapted for inhalation and especially such compositions which are self propelled. In addition to the primary active ingredient and propellant such compositions may include other pharmacologically active ingredients such as parasympatholytic drugs, steroids, antibiotics, hypnotics and mucolytic agents including enzymes and compounds such as acetylcysteine. A particularly useful parasympatholytic agent for use in inhalant compositions of this type is atropine methonitrate. In addition to the active ingredients there may be included inactive fillers to adjust the powder density of suspensions, cosolvents and suspending agents which are pharmaceutically acceptable and compatible with the active ingredients.

In addition to the preferred propellants which are the chlorofluoroalkanes, other liquid propellants such as butane mixtures or gaseous propellants such as nitrous oxide and carbon dioxide may be employed.

The preferred formulation is a self-propelled aerosol suspension packed in a container with a metered dose valve dispensing 25–100 $\mu$l. per dose. The concentration of the novel noradrenaline derivatives in the formulation is adjusted to give 0.25 to 5.0 mg. per dose. A particular preferred composition comprises 2-cyclobutylamino-1-(3,4 - dihydroxyphenyl)-ethanol or a salt thereof in the form of a metered dose aerosol suspension delivering a dose of 0.5 mg. of the active ingredient in 50 $\mu$l. of suspension.

In the following examples, the propellants are referred to under their trade names for convenience. These, and the chemical equivalents, being as follows:

Freon 11 ---------- Trichlorofluoromethane.
Freon 12 ---------- Dichlorodifluoromethane.
Freon 114 --------- 1,2-Dichloro-1,2,2-tetrafluoroethane.

The following non-limitative examples illustrate the invention.

*Example 1*

To a stirred solution of 4-chloroacetylcatechol (4.5 g.) in 95% ethanol (20 ml.) at room temperature was added a solution of cyclobutylamine (3.7 g.) in 95% ethanol (4 ml.) while oxygen-free nitrogen was bubbled through the solution. The mixture was warmed to 45° C. and maintained at 40–45° C. with stirring under an atmosphere of nitrogen for 24 hours. After cooling to room temperature the precipitate was filtered off, washed with ice cold ethanol and suspended in absolute ethanol (50 ml.). Hydrochloric acid gas was passed into the mixture until the solid dissolved, the solution was cooled and the solid which separated was washed with cold ethanol and air dried. There was thus obtained 2-cyclobutylamino-3′,4′-dihydroxyacetophenone hydrochloride M.P. 248° C. (dec.).

(Found: N, 5.4. $C_{12}H_{16}ClNO_3$ requires N, 5.5%.)

This hydrochloride (1.5 g.) was dissolved in warm absolute ethanol (25 ml.) and the solution was shaken with 10% palladium charcoal in an atmosphere of hydrogen for 6 hours at 60° C. and atmosphereic pressure. The catalyst was filtered off and the filtrate was poured into dry ether (2 l.). The cloudy suspension was cooled off, washed with a little ether and air dried. There was thus obtained 2-cyclobutylamino - 1 - (3,4-dihydroxyphenyl)-ethanol hydrochloride M.P. 171° C. (dec.).

(Found C, 55.2; H, 7.3; N, 5.7. $C_{12}H_{18}ClNO_3$ requires C, 55.5; H, 6.9; N, 5.4%.)

A solution of 2-bromo-3′, 4′-dibenzyloxyacetophenone (1 g.) and cyclopropylamine (0.25 g.) in dry ether (75 ml.) was allowed to stand at room temperature for 17 hours. The amine hydrobromide which precipitated was filtered off and the ethereal filtrate was shaken with 5 N hydrochloric acid. The yellow precipitate was filtered off, dried and crystallised from ethanol to give 2-cyclopropylamino-3′,4′-dibenzyloxyacetophenone hydrochloride M.P. 188–190° C.

(Found: N, 3.2; $C_{25}H_{25}NO_3$.HCl requires N, 3.2%.)

This acetophenone hydrochloride (0.5 g.) was suspended in methanol (50 ml.) and warmed to 45° C. with stirring. 5 N sodium hydroxide (0.5 ml.) was added followed by a solution of sodium borohydride (0.1 g.) in water (10 ml.) containing 5 N sodium hydroxide (2 drops). The mixture was stirred at 45° C. for 1 hour, cooled in ice and acidified with 5 N sulphuric acid (5 ml.). Half of the methanol was distilled off at room temperature, the concentrate was cooled with ice, basified and extracted with ether (5×50 ml.). The combined extracts were dried with anhydrous magnesium sulphate, evaporated at room temperature and the residue crystallised from light petroleum (B.P. 62–65° C.) to give 2-cyclopropylamino - 1 - (3,4-dibenzyloxyphenyl)-ethanol; M.P. 99° C.

This was converted to the hydrochloride which melted with decomposition at 147–149° C.

(Found: C, 71.2; H, 7.0; Cl, 8.5. $C_{25}H_{27}NO_3$.HCl requires C, 70.5; H, 6.7; Cl, 8.4%.)

This dibenzyloxy derivative (1.84 g.) dissolved in ethanol (70 ml.) was hydrogenated at 754 mm., 25° C. with a 10% palladised charcoal catalyst (0.9 g.) taking up in the process 250 cc. of hydrogen. After filtering off the catalyst, the filtrate was evaporated under reduced pressure to 10 ml., warmed and filtered hot and after cooling was precipitated in ether. The oil was triturated until solid, the solid was filtered off and suspended in hot acetone (20 ml.). Ethanol was added until the solid completely dissolved and the solution was filtered hot. Ether was added to cloudiness and the solution was left to crystallise at 0° C. 2-cyclopropylamino-1-(3,4-dihydroxyphenyl)-ethanol hydrochloride crystallised as white cubes M.P. 153–154° C. (dec.).

(Found: C, 53.6; H, 6.5. $C_{11}H_{15}NO_3$.HCl requires C, 53.8; H, 6.5%.)

*Example 3*

A metered-dose aerosol composition comprises:

| | | |
|---|---|---|
| 2 - cyclobutylamino-1-(3,4-dihydroxyphenyl)-ethanol hydrochloride | mg | 100 |
| Sorbitan tri-oleate | mg | 50 |
| Freon 12/Freon 114 mixture (30/70 parts w./w.) | ml | 10 |

Pressure 35 lbs./sq. in.

The container delivers a metered dose of 50 $\mu$l. containing 0.5 mg. of the active ingredient.

*Example 4*

A metered-dose aerosol composition comprises:

| | | |
|---|---|---|
| 2 - cyclobutylamino-1-(3,4-dihydroxyphenyl)-ethanol hydrochloride | mg | 150 |
| Atropine methonitrate | mg | 60 |
| Freon 12/Freon 114 mixture (30/70 parts w./w.) | ml | 15 |

The container delivers a metered dose of 50 $\mu$l. containing 0.5 mg. of the noradrenaline derivative and 0.2 mg. of atropine methonitrate.

A similar composition was prepared containing, in addition, 75 mg. of sorbitan tri-oleate as suspending agent.

*Example 5*

A batch of No. 3 hard gelatin capsules was prepared, each containing;

| | Mg. |
|---|---|
| 2 - cyclobutylamino-1-(3,4-dihydroxyphenyl)-ethanol hydrochloride | 10 |
| Starch | 148 |
| Magnesium stearate | 2 |

A similar composition was filled into No. 5 hard gelatin capsules each containing:

| | Mg. |
|---|---|
| 2 - cyclobutylamino-1-(3,4-dihydroxyphenyl)-ethanol hydrochloride | 10 |
| Starch | 69 |
| Magnesium stearate | 1 |

*Example 6*

A solution for inhalation as a spray was prepared containing:

| | | |
|---|---|---|
| 2-cyclobutylamino-1-(3,4-dihydroxyphenyl)-ethanol hydrochloride | g | 1 |
| Sodium metabisulphite | g | 0.1 |
| Propylene glycol | ml | 5 |
| Water | ml. to | 100 |

*Example 7*

A batch of sublingual tablets was prepared containing:

| | Mg. |
|---|---|
| 2 - cyclobutylamino-1-(3,4-dihydroxyphenyl)-ethanol hydrochloride | 10 |
| Citric acid | 1.6 |
| Sodium metabisulphite | 1.6 |
| Stearic acid | 1.6 |
| Magnesium stearate | 1.2 |
| Lactose | 72 |
| Icing sugar | 72 |

We claim:
1. A compound selected from the group consisting of 2 - cyclobutylamino-1-(3,4-dihydroxyphenyl)-ethanol and its non-toxic acid addition salts.
2. 2-cyclobutylamino-1-(3,4-dihydroxyphenyl)-ethanol.
3. 2 - cyclobutylamino - 1 - (3,4-dihydroxyphenyl)-ethanol hydrochloride.

References Cited

UNITED STATES PATENTS 2,520,516   8/1950   Zoeren _____ 260—329

OTHER REFERENCES

Biel et al., Journal American Chemical Society, vol. 76, pp. 3149–53 (1954).

Corrigan et al., Journal American Chemical Society, vol. 71, pp. 530–1 (1949).

Lands et al., Proc. Soc. Exptl. Biol. Med., vol. 116, No. 2, pp. 331–3 (1964).

Siegmund et al., J. Pharmacol. Exptl. Therapy, vol. 97 pp. 14 and 18 (1949).

CHARLES B. PARKER, *Primary Examiner.*

SAM ROSEN, *Examiner.*

S. J. SINGER, R. V. HINES, *Assistant Examiners.*